US012103023B2

United States Patent

(12) United States Patent
Laikind et al.
(10) Patent No.: US 12,103,023 B2
(45) Date of Patent: Oct. 1, 2024

(54) MIST AND DRINK BOTTLE CAP

(71) Applicant: Extreme Mist PCS, LLC, Scottsdale, AZ (US)

(72) Inventors: Ronald Brian Laikind, Scottsdale, AZ (US); Michael Edward Sands, Phoenix, AZ (US); Mark Holzwanger, Hewlett, NY (US)

( * ) Notice: Subject to any disclaimer, the term of this patent is extended or adjusted under 35 U.S.C. 154(b) by 0 days.

(21) Appl. No.: 18/584,335

(22) Filed: Feb. 22, 2024

(65) Prior Publication Data

US 2024/0189846 A1 Jun. 13, 2024

Related U.S. Application Data

(63) Continuation-in-part of application No. PCT/US2023/016436, filed on Mar. 27, 2023, and a continuation-in-part of application No. 18/125,920, filed on Mar. 24, 2023, now Pat. No. 12,005,461.

(60) Provisional application No. 63/326,879, filed on Apr. 3, 2022.

(51) Int. Cl.

| | |
|---|---|
| ***B05B 11/00*** | (2023.01) |
| ***B65D 47/12*** | (2006.01) |
| ***B65D 47/14*** | (2006.01) |
| ***B65D 51/16*** | (2006.01) |
| ***B65D 51/24*** | (2006.01) |

(52) U.S. Cl.

CPC ........ *B05B 11/0086* (2013.01); *B65D 47/123* (2013.01); *B65D 47/143* (2013.01); *B65D 51/1644* (2013.01); *B65D 51/24* (2013.01)

(58) Field of Classification Search

CPC ... B05B 11/0086; B05B 1/10; B05B 11/0008; B05B 11/1043

See application file for complete search history.

(56) References Cited

U.S. PATENT DOCUMENTS

| | | | | |
|---|---|---|---|---|
| 6,161,777 | A | 12/2000 | Carter | |
| 7,143,958 | B1 * | 12/2006 | Dorney | B05B 11/0086 220/705 |
| 2006/0273195 | A1 | 12/2006 | Junkel | |
| 2008/0006718 | A1 | 1/2008 | Junkel | |
| 2008/0169575 | A1 | 7/2008 | Chen | |
| 2012/0267400 | A1 | 10/2012 | Mohr | |
| 2014/0014740 | A1 | 1/2014 | Sands | |

* cited by examiner

*Primary Examiner* — Vishal Pancholi

(57) ABSTRACT

A drink and mist bottle cap is detachably attachable to a bottle to enable a person to produce a mist from a pump and mist nozzle and also drink from a drink spout. A drinking spout has a drink spout cap that is detachably attachable over the drinking spout to seal the liquid contents within the bottle when not drinking form the bottle. The drink and mist bottle cap may also have an anti-backwash valve that is configured to prevent backwash from flowing back into the interior of the bottle and an ultraviolet light configured to produce a disinfecting ultraviolet light within the bottle, and a pressure relief valve to allow pressure equalization when there is a pressure differential between the interior of the bottle and the exterior of the bottle.

19 Claims, 9 Drawing Sheets

MIST AND DRINK BOTTLE CAP

CROSS REFERENCE TO RELATED APPLICATIONS

The invention relates is a continuation in part of U.S. patent application Ser. No. 18/125,920, filed on Mar. 24, 2023, which claims priority to provisional patent application No. 63/326,879 filed on Apr. 3, 2022, and this application is a continuation in part of international patent application No. PCT/US2023/016436 filed on Mar. 27, 2023.

BACKGROUND OF THE INVENTION

Field of the Invention

The invention relates a drink and mist bottle cap configured to detachably attach to a bottle to enable a person to drink therefrom or produce a mist for cooling.

Background

In hot environments, a person may want to hydrate by drinking and also cool themselves by producing a mist. Bottles exist that combined drinking and manually operated. Manual operated misting requires a trigger or button or requires the bottle to be squeezed. Additionally, other prior art does not deliver a very fine mist, and use a lot more water while misting/spraying. They also need to be paired with a specific bottle and cannot be retrofitted to existing water bottles.

SUMMARY OF THE INVENTION

An exemplary drink and mist bottle cap is configured to detachably attach to a bottle and enable a person to produce a mist from a pump and mist nozzle and also drink from the drink spout. The drink and mist bottle cap includes an exterior cap that has threads, such as universal threads, configured to detachably attach to threads of a bottle. A drinking spout is coupled to this exterior cap and has a drink spout cap that is detachably attachable over the drinking spout to seal the liquid contents within the bottle when not drinking form the bottle. The drink and mist bottle cap may also have an anti-backwash valve that is configured to prevent backwash from flowing back into the interior of the bottle. The drink and mist bottle cap may also have a mist nozzle that is coupled with a pump configured with the drink and mist bottle cap to produce a mist from the mist nozzle. Also, an ultraviolet light may be configured to produce a disinfecting ultraviolet light within the bottle. Also, the drink and mist bottle cap may include a pressure relief valve to allow pressure equalization when there is a pressure differential between the interior of the bottle and the exterior of the bottle. The pressure relief valve may be configured in the drink spout cap, as there would be an opening to the bottle when the drink spout cap is detached from the drink spout.

An actuator such as an on/off actuator, may be configured on the drink and mist bottle cap to turn on the pump to initiate a mist from the mist nozzle. The pump may be configured in the interior portion of the drink and mist bottle cap, or portion that extends down into the bottle when the drink and mist bottle cap is attached to said bottle. The pump may receive liquid from within the interior of the bottle through an intake tube that is flexible to allow the intake tube to bend as required to keep an intake weighted strainer within liquid inside the bottle. The intake tube may be made of a flexible polymer, such as silicone or polyurethane and may be flexible to allow bending 180 degrees without kinking the intake tube. When a bottle is turned upside down and a person turns on the pump to produce a mist, the intake weighted strainer may move within the liquid to remain submerged in the liquid, such as water. In this way, the pump receives water for producing a mist even when the bottle is turned upside down. It should be appreciated that a stiff intake tube would not enable this function.

The intake tube is coupled with the pump and may couple with an integral conduit that is formed within the interior chamber of the interior portion of the drink and mist bottle cap. This conduit formed along the interior chamber may couple directly with the pump and with the intake tube and may be more durable than a loose tube within the interior portion.

The liquid within the bottle may be filtered prior to being received by the pump. The intake weighted strainer may include one or more filters to prevent debris from reaching the pump and clogging the pump and/or mist nozzle. A pre-filter may be configured as an initial filter and may prevent larger particle from passing therethrough, such as about 250 μm or larger, about 150 μm or larger, about 100 μm or larger and any range between and including the sizes provided. A primary filter may be tighter or prevent smaller particles than the pre-filter from passing therethrough, such as about 100 μm or larger, about 75 μm or larger, about 50 μm or larger and any range between and including the sizes provided. A final filter may be tighter or prevent smaller particles than the primary filter from passing therethrough, such as about 50 μm or larger, about 25 μm or larger, about 10 μm or larger, about 5 μm or larger and any range between and including the sizes provided. The pre-filter and the primary filter may be configured in the intake weighted strainer and the final filter may be configured more proximal to the pump.

The drink and mist bottle cap may include a battery or batteries to power the pump and these batteries may be rechargeable batteries. A drink and mist bottle cap may include a charging port, such as a Universal Serial Bus (USB) charging port for charging the battery or batteries. The battery within the drink and mist bottle cap as well as the pump may be sealed from the liquid within the bottle.

The mist nozzle may be configured to produce a mist for cooling off a person on hot days. The mist may be an aerosol of the liquid within the bottle and may be a fine mist having droplets sizes of about 100 μm or less, about 80 μm or less, about 60 μm or less, about 50 μm or less, about 25 μm or less, or in the range of about 80 μm to about 100 μm, or from about 10 μm to about 60 μm and any other range between and including the values provided. The mist nozzle may be detachable form the drink and mist bottle cap to enable cleaning or changing from one mist nozzle to another.

The drink and mist bottle cap of claim 1, further comprising an intake tube coupled with the pump and, with the drink and mist bottle cap attached to a bottle, configured to extend into said bottle to draw fluid from within said bottle to said pump;

A drink and mist bottle cap may include an anti-backwash valve that includes a drink valve that opens when the liquid flow from the bottle and presses on the drink valve and closes when backwash flow from the drink spout and presses on the opposing side of the drink valve. The drink valve may be hinged and configured between a drink reservoir in the drink spout and the drink conduit that leads into the bottle.

The drink reservoir may retain the backwash, which can be poured out or will be consumed the next time the person drinks from the bottle.

A drink and mist bottle cap may include an ultraviolet light that produces ultraviolet light with a wavelength that disinfects by destroying pathogens or neutralizing them so they can not replicate. An ultraviolet light may produce UV light that is skin safe or neutralizing UV light, such as UV light having a wavelength of about 222 nm and/or a destroying UV light having a wavelength of about 270 nm. An exemplary UV light may have wavelength within the ultraviolet germicidal irradiation (UVGI) range or from about 200 nm to about 300 nm. A wavelength of 222 nm, or having a range around this specific value of about 10 nm or less, about 5 nm or less, and preferably by 2 nm or less and most preferably by 1 nm or less may be desired for effectiveness and for safety. A neutralizing UV light may prevent any pathogens, such as a virus from replicating and thereby prevent infection by the virus while a destroying UV light may destroy the virus by breaking or more molecular bonds in the RNA or DNA of the virus. An ultraviolet light may be configured to emit light from the interior portion and may be configured on an extended end of the interior chamber.

A drink and mist bottle cap may have a pressure relief valve that is configure in the drink spout cap to equalize pressure between the interior of the bottle and the exterior of the bottle. When the pump is used to create a mist with the drink spout cap on, the removal of liquid from the bottle to produce the mist, produces a vacuum pressure within the bottle and this can cause the pump to work much harder to overcome this vacuum to pump the liquid. A pressure-relief valve may be configured to open when a pressure difference between the interior and exterior of the bottle reaches a threshold value. The pressure relief valve may include a bladder that automatically opens then the differential reaches said threshold. Also, the pressure relief valve may open to allow air to flow from the interior of the bottle out of the bottle when the pressure outside of the bottle is reduced, such as due to travel, changes in elevation, air travel and the like.

The present invention relates to a Drink and Mist Bottle Cap apparatus and system. The Drink and Mist Bottle Cap apparatus and system is the first electric operated mister that you can also drink normally from without changing fittings or fitting settings. It has a universal thread that can be retrofitted to many of the most popular bottles.

The unique features include:

A micro pump (also referred to as pump);

The pump and battery are located in a waterproof tube or housing;

A high-pressure line delivering a 10 to 60 Micron particle of mist;

A draw tub a watertight fitting at the bottom of the tube;

Pump tube positioning/location; and

The pump and tubing are also located in the casing tube.

The Drink and Mist Bottle Cap apparatus and system is an improvement over similar product in that it fits to existing water bottles from many different manufacturers, so you do not need to stop using your favorite water bottle. It offers a much finer mist that is more cooling and gets you less wet than the others. The mist generation is electric, so it is much easier to operate and delivers a continuous cooling mist without the need to manually pump or squeeze it. You can naturally drink, and mist from the same water bottle. The Drink and Mist Bottle Cap apparatus and system have unique features that include:

1. A universal thread that can be retrofitted to a multitude of bottles.
2. An electric operated mister that allows a user to mist or drink without changing fittings or fitting settings.
3. A pump may be a micro pump that is small in size and can pump lower volumes of liquid for creating a mist, such as about 5 ml/min or more, about 10 ml/min or more, about 25 ml/min or more, about 50 ml/min or more and any range between and including the values provided. A pump may be a diaphragm pump, a peristaltic pump, a piston pump and the like. A pump may operate or produce a high pressure fluid to the mist nozzle, such as about 20 psi or more, about 40 psi or more, about 60 psi or more, about 80 psi or more, or even about 100 psi or more, or in a range of about 40 to 65 psi. The pump may be connected with the on/off switch or button and will deliver high pressure liquid to the mist nozzle to produce the mist. The pump may be powered by a rechargeable battery. The battery may be charged through a mini-USB port located on or in the cap.
4. The pump and battery are located in a waterproof tube that fits to the cap by mechanical means. The tube housing may be made to have the lowest profile possible so that it does not displace more than 3 OZ of water when placed into the water.
5. A high-pressure line and/or fitting runs from the pump's output port to a hole in the lid and has threads or other mechanical means to attach an ultra-fine mist nozzle though the cap's main lid to the hose and/or fitting.
6. The mist nozzle may be capable of delivering a 10 to 60 Micron particle of mist and only uses about 1 OZ of water for every minute of continues misting.
7. A draw tub may be attached to the pump's input port and routed in a fashion to go down the inside of the waterproof pump tube and out a watertight fitting at the bottom of the tube.
8. The pump tube may be positioned to one side of the underneath side of the cap in a way for a drinking port to allow water to flow freely when tipped upside down.
9. The pump and tubing may be located in the casing tube.

Further novel features and other objects of the present invention will become apparent from the following detailed description, discussion and the appended claims, taken in conjunction with the drawings.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
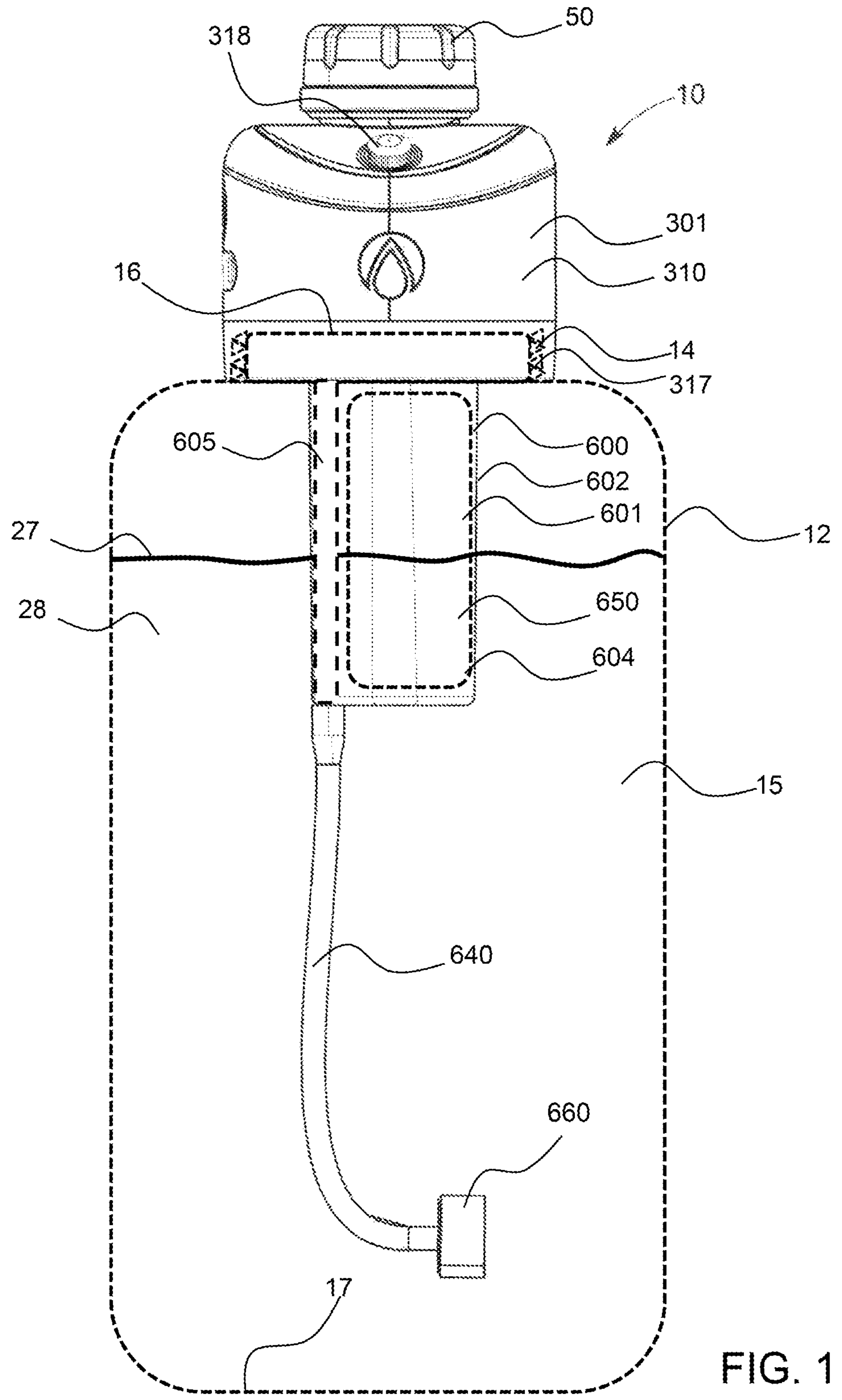
FIG. 1 shows a side view of a drink and mist bottle cap having an exterior cap with a drinking spout therein and a drink spout cap configured cover the drinking spout and an intake tube configured to extend down into a bottle and a mist nozzle configured to produce a mist.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be an included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIGS. 1 to 6, a drink and mist bottle cap 10 comprises an exterior cap 310, a drink spout cap 50, a first semicircular battery housing 102 and a second semicircular battery housing 142 with said first semicircular battery housing 102 having an interior concaved surface 104 and said first semicircular battery housing 102 having a first end 106 having two female openings 108 and 110 sized to receive two male protrusions 144 and 146 affixed to a first end 148 of second semicircular battery housing 142.

Said second semicircular battery housing 142 has a second end 150 having one male protrusion 152 sized to mate with one female opening 132 on second end of first semicircular battery housing 102. Said Interior concaved surface 104 further comprises a first vertical wall 112 a second vertical wall 114, and a horizontal wall 116 extending from said concaved Interior surface 104 with said first vertical wall 112 and said second vertical wall 114 sized to receive a battery 300.

Semicircular battery housing 102 further comprises a charging port 165, such as a Universal Serial Bus (USB) Port Housing 160 having a first circular opening 162, a second horizontal oval opening 164, and a third vertical oval opening 166. The USB Port allows a user to recharge the battery for misting operations. Said USB Port housing is further sized to receive a USB Port water proof cover 200 having a first frustrum protrusion 202, a second horizontal oval protrusion 204, and a third vertical oval protrusion 206. This forms a water proof closure to protect the battery during use but allows user to open for recharging of the battery.

Further referring to FIGS. 1 to 8, said exterior cap 310 has an exterior surface 316, and integrally formed drink spout 312 with said exterior surface 316 having an opening of equal size to nozzle fitting 400. Said nozzle fitting 400 further contains an opening 402 sized to receive nozzle 420. Said exterior cap 310 further comprises an upper portion having a concave section 320 sized to receive handle 450 having a convex portion. The rotatable handle 450 forms a smooth connection to the exterior cap 310 when in the down position. Said handle 450 further comprises a first end 454 and a second end 456 with both first end 454 and second end 456 having a circular opening 460 sized to receive female hinge pin 470. Said female hinge pin 470 has an opening 472 sized to mate and accept male hinge pin 480 to rotatable affix handle 450 to said exterior cap 310.

An exemplary drink and mist bottle cap 10, further includes a tether 500 having an opening 502 that is sized to receive said female hinge pin 470 and a cylindrically shaped pump housing 600 having an exterior surface 602 and an interior chamber 604 sized to receive pump 650. Said pump housing 600 further has a lower portion 610 having an outlet 612 that is direct connection with first end 642 of intake tube 640. Said intake tube 640 has a lower portion 644 that connects to intake weighted strainer 660. During use the drink and mist bottle cap 10 removable attaches to a separate container (not illustrated) to allow a user to drink or mist. Said Exterior Cap 310 has a lower portion that contains a universal thread 315 for mating with various external bottles. A user can activate the pump by pressing the on/off actuator 190. It also understood that an adapter can be used for mating with various diameters for the external bottles. Then, the user may drink by opening the drink spout. Or, the user may activate the misting operation by pressing the pump actuator. When the pump actuator is pressed, the pump is activated causing water to be pulled from the lower container through the tubing to the mist nozzle 318 where the water molecules are atomized to form a mist for the user.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

Figure 2:
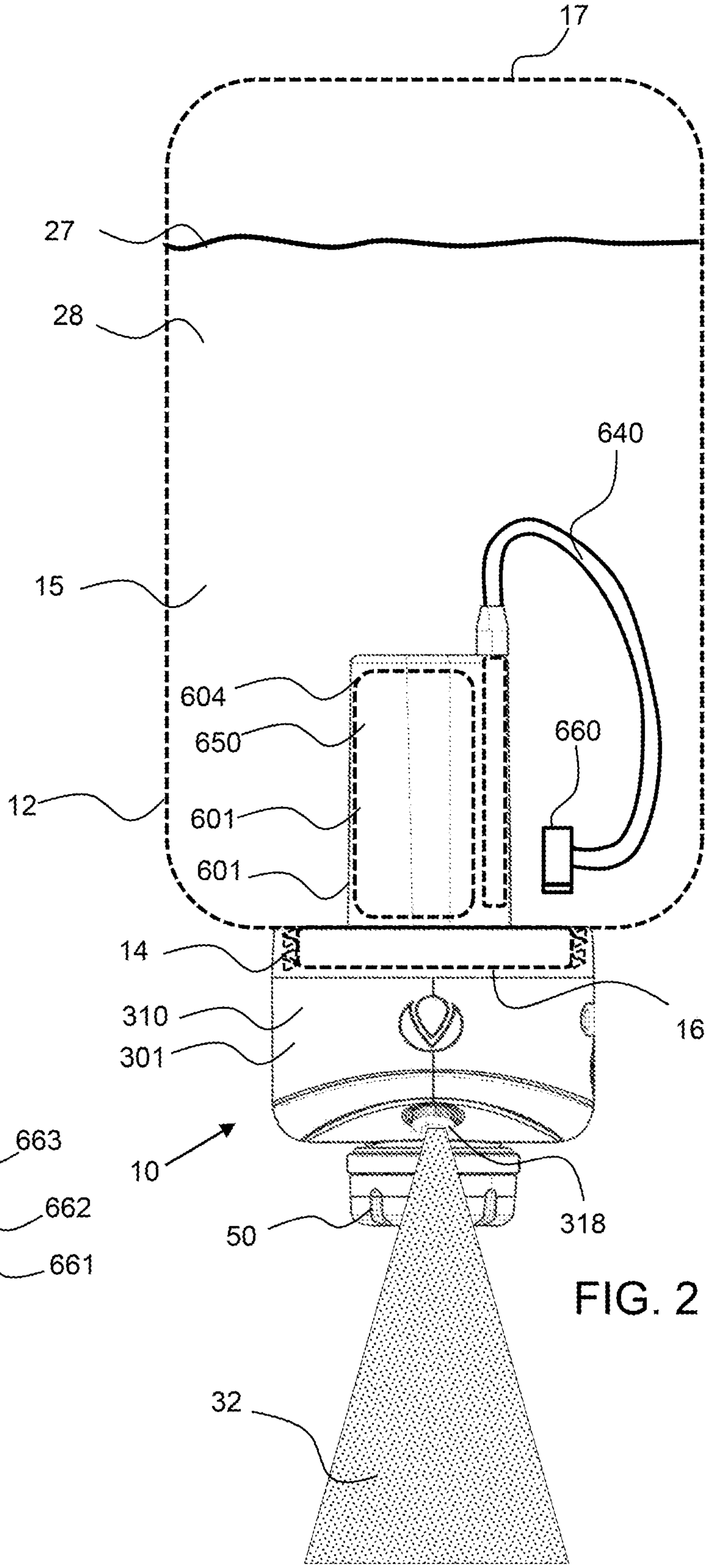
FIG. 2 shows a side view of a drink and mist bottle cap having an exterior cap with a drinking spout therein and a drink spout cap configured cover the drinking spout and an intake tube configured to extend down into a bottle and a mist nozzle configured to produce a mist.

As shown in FIGS. 1 and 2, an exemplary drink and mist bottle cap 10 has an exterior cap 310 forming an exterior portion 301 of the drink and mist bottle cap that is configured to extend over an opening 16 of a bottle 12 and an interior portion 601 configured for insertion into an interior 15 of said bottle 12. The drink and mist bottle cap has threads 317 configured to thread onto the bottle threads 14. The exterior portion has a drinking spout (not visible) and a drink spout cap 50 configured to cover the drinking spout. Also, a mist nozzle 318 is configured in the exterior cap 310 and is configured to produce a mist of water. The interior potion 601 includes an interior chamber 604 forming a pump housing 600 that encloses the pump for pumping fluid, such as water from the interior of the bottle to the mist nozzle 318. An intake tube 604 extends from the interior chamber 604 to an extended end 641 that may have an intake weighted strainer 660 configured thereon to filter the water. The intake tube fluidly couples the pump 650 with the interior of the bottle and providing a conduit for fluid from the interior of the bottle to the pump. An integral conduit 605 may be molded into or otherwise formed along the interior portion 601 and couple the intake tube 640 with the pump 650.

As shown in FIG. 2, the bottle 12 is configured upside down, with the drink and mist bottle cap 10 configured below the base 17 of the bottle. The intake weighted strainer 660 is coupled to a flexible intake tube 640 that enables the intake weighted strainer 660 to fall within the liquid 28 within the bottle 12. Note that the flexile intake tube can bend 180 degrees without kinking to allow fluid to flow therethrough even when the bottle is turned upside down. Also, the flexible intake tube 640 and intake weighted strainer 660 enable fluid flow to the pump, even when the bottle is configured upside down. Note that the fluid level 27 in the bottle 12 is above the drink and mist bottle cap 10 in FIG. 2.

Figure 3:
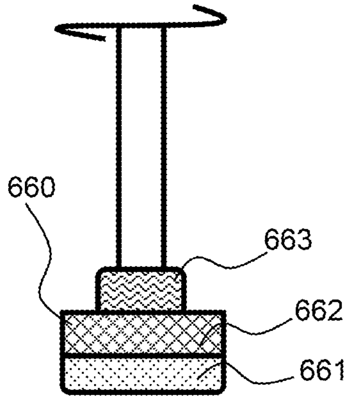
FIG. 3 shows a side cross-sectional view of the intake weighted strainer and the filters configured with the intake weighted strainer.
Figure 4:
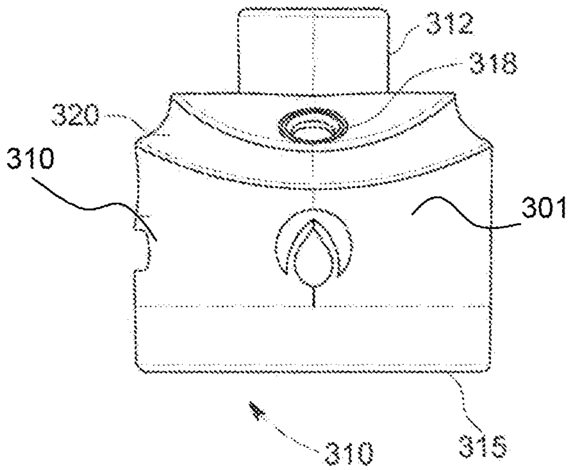
FIG. 4 shows the exterior cap portion of the drink and mist bottle cap having a drinking spout and a mist nozzle.
Figure 5:
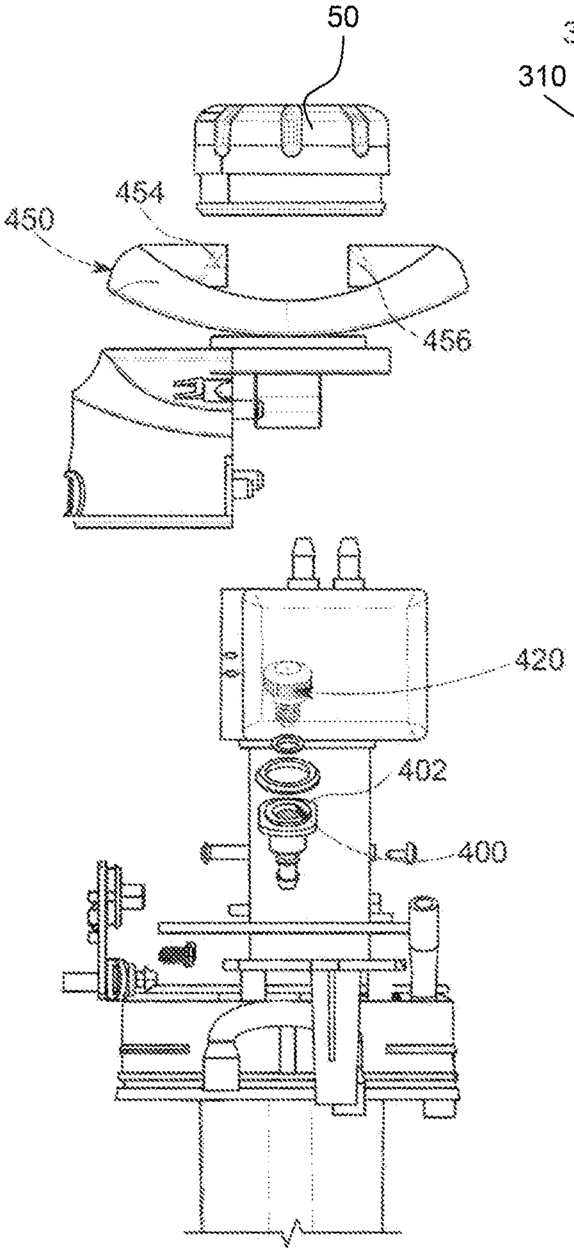
FIG. 5 shows a side view of portions of the drink and mist bottle cap including the insert portion and portions of the exterior portion.
Figure 6:
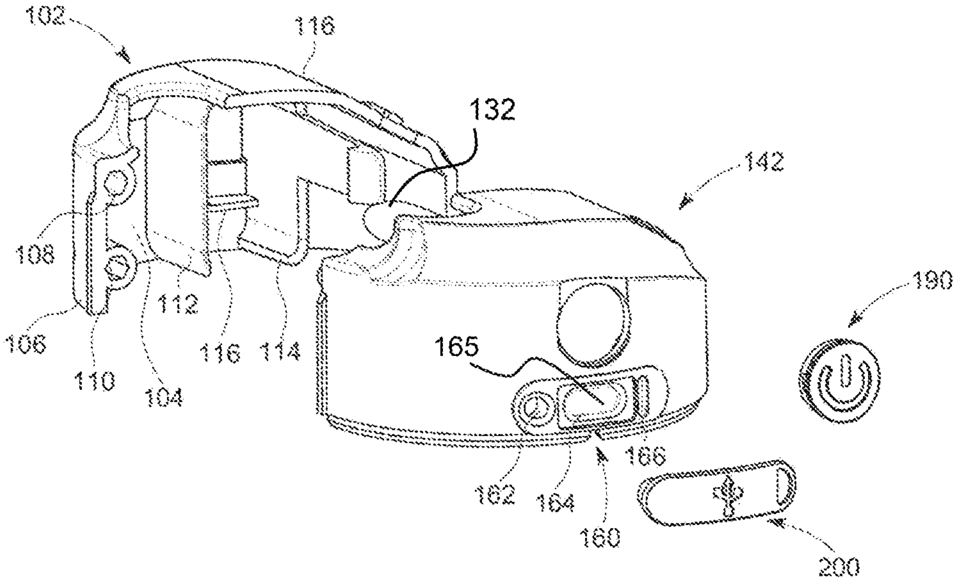
FIG. 6 shows a perspective view of the exterior cap and components coupled thereto.

As shown in FIG. 3, the intake weighted strainer 660 has a pre-filter having a filter that prevents 100 μm and larger particles from passing therethrough, a primary filter that prevents 50 μm particles and larger from passing therethrough and a final filter that prevents 5 μm and larger particles from passing therethrough. This arrangement of incrementally finer filters prevents very small particles from passing to the pump which may clog the mist nozzle. Also, this incremental arrangement prevents clogging of the finer filters.

As shown in FIG. 3, the intake weighted strainer 660 may include one or more filters such as a pre-filter 661, a primary filter 662 and a final filter 663. Note that the final filter may be configured more proximal to the pump.

Figure 8:
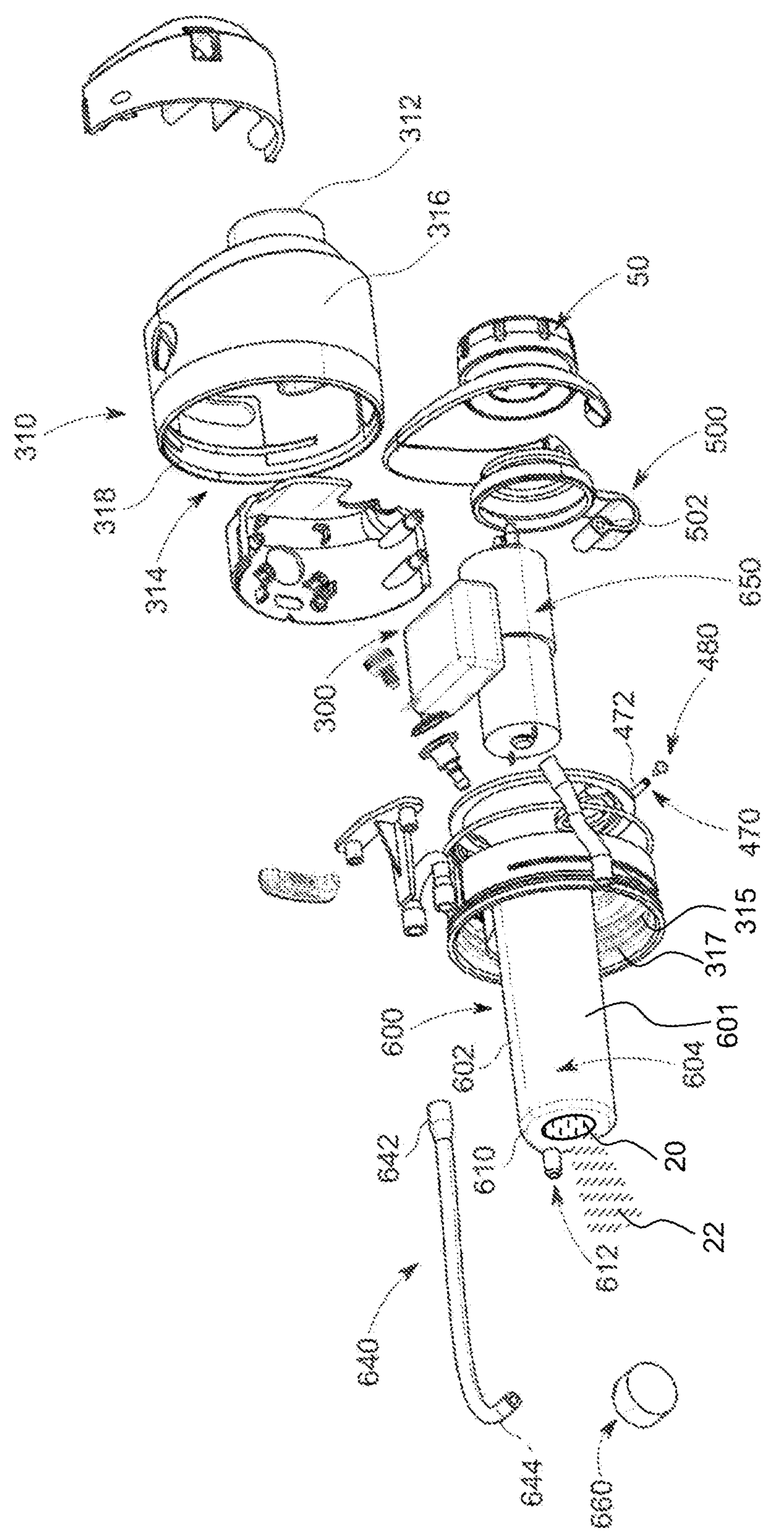
FIG. 8 show an exploded view of a drink and mist bottle cap.

As shown in FIG. 8, an ultraviolet light device 20 is configured to emit ultraviolet light 22 into the interior of a bottle when the drink and mist bottle cap is attached to a bottle. The ultraviolet light device 20 may be coupled to the interior portion 601, such as to the interior chamber 604 and emit light from an extended end of the interior chamber. As described herein, the ultraviolet light device 20 may emit a UV light that has a wavelength configured to destroy or deactivate bacteria.

Figure 7:
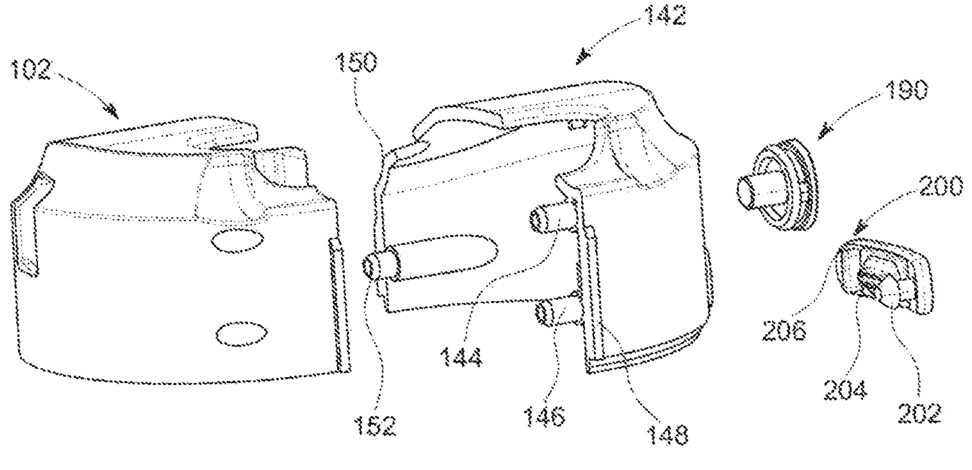
FIG. 7 shows a perspective view of the exterior cap and components coupled thereto.
Figure 9:
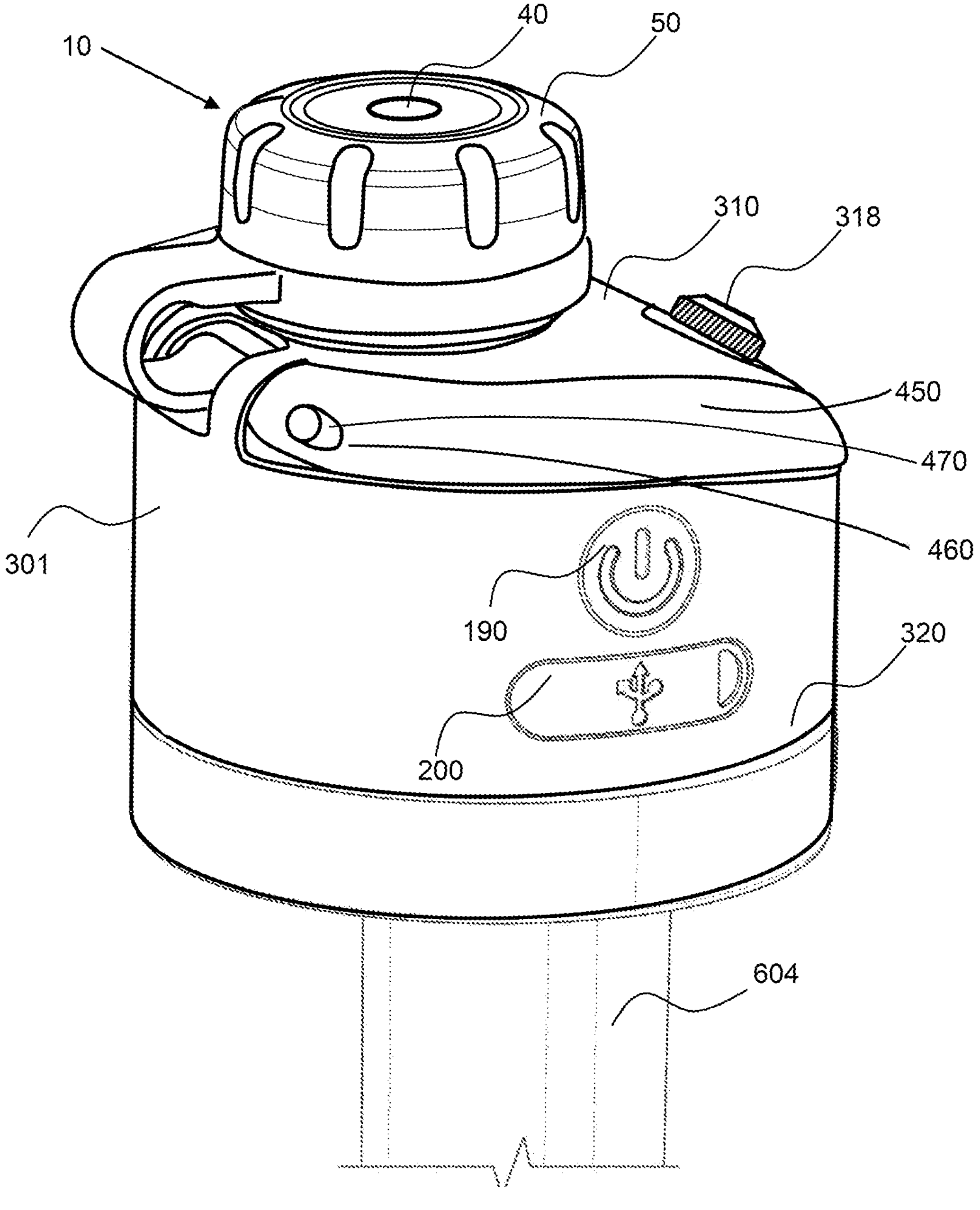
FIG. 9 shows a perspective view of a drink and mist bottle cap.
Figure 10:
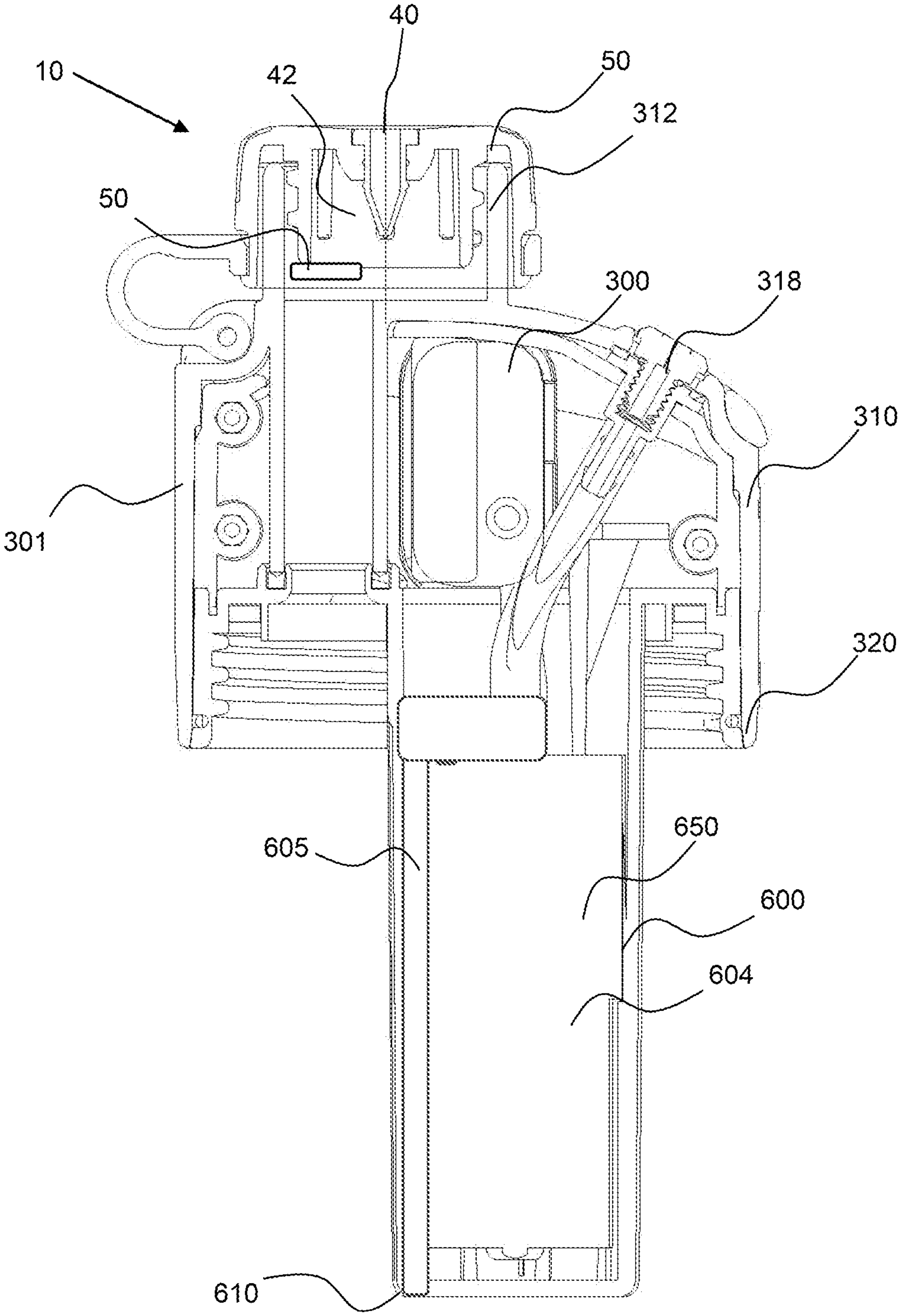
FIG. 10 shows a cross-sectional view of a drink and mist bottle cap.

With reference now to FIGS. 9 and 10, an exterior portion of the drink and mist bottle cap 10 has a pressure relief valve 40 in the drink spout cap 50 to allow a flow of air into an interior of a bottle to relieve a vacuum formed by the mist nozzle 318 forming a mist from fluid within the bottle. As a mist is formed with the drink spout cap 50 on the drink spout to form a seal, a vacuum is formed in the interior of the bottle that can interfere with the pump being able to draw fluid therein for mist formation. As shown in FIG. 10, the pressure relief valve 40 may include a bladder 42 that opens automatically when a vacuum pressure above a threshold limit is formed between the interior of the bottle and the exterior of the bottle. The bladder may be an elastic valve, or comprise an elastic bladder producing a burp valve, a type of valve that opens temporarily and automatically to equilibrate pressure. When the pump is used to pump liquid from the bottle to create a mist, a vacuum pressure is generated within the interior of the bottle from the reduction in volume of the liquid. The pressure relief valve may then open to allow air from outside the bottle to flow in to relieve this vacuum pressure. Also, when there are atmospheric pressure changes, such as when changing elevation, a vacuum pressure may be produced on the exterior of the bottle and again the pressure relief valve may open to allow pressure equalization between the interior of the bottle and the exterior of the bottle. traveling the pressure outside. Atmospheric changes may occur when driving up or down large elevation changes or during air travel. The pressure relief valve may be a dual-way pressure relief valve that opens to equilibrate or allow airflow into or out of the bottle. The bladder may be an elastomeric material that spring shut after a flow of air passes through the pressure relief valve 40 to relieve the vacuum. Also shown in FIG. 10 is the battery 300 and the pump 650 within the pump housing 600. FIG. 7 shows the on/off actuator 190 as well as the charging port cover 200.

Figure 11:
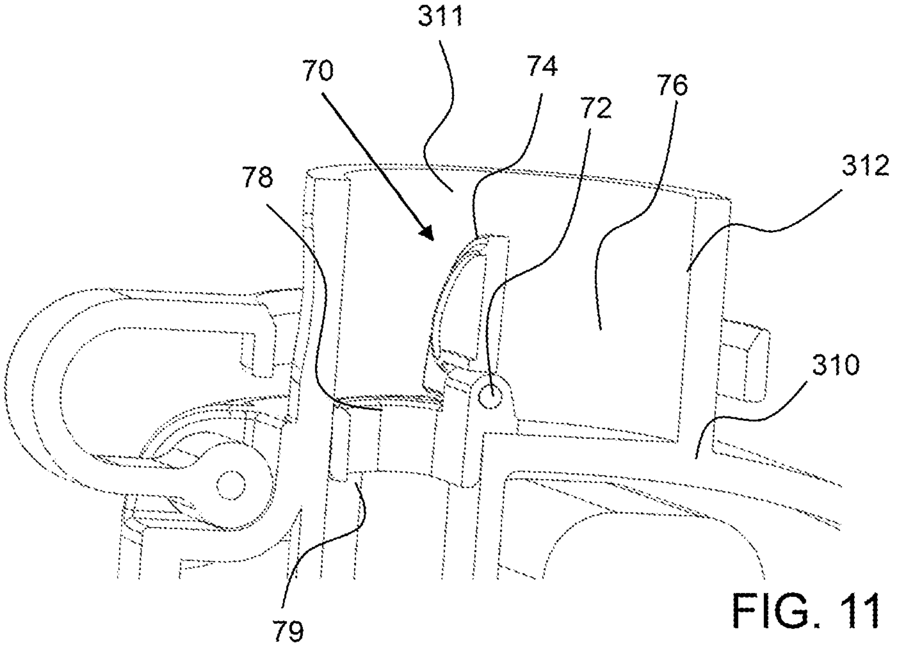
FIG. 11 shows a side cut-away view of a drink and mist bottle cap having an anti-backwash valve.
Figure 12:
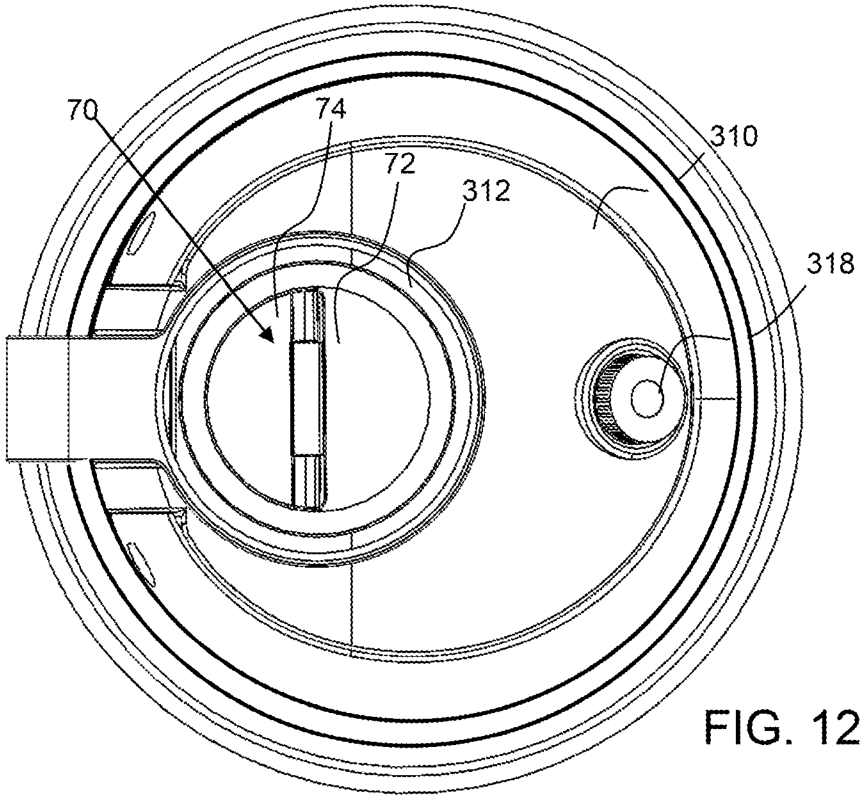
FIG. 12 shows a top cut-away view of a drink and mist bottle cap having an anti-backwash valve.

With reference to FIGS. 11 and 12, a drink and mist bottle cap 10 may include an anti-backwash valve 70, that is configured to prevent fluid from passing back into the interior of the bottle from the outlet of the drink spout 312. The anti-backwash valve 70 includes a drink-valve 74 coupled with a pivot 72, wherein a flow of water from the interior of the bottle up through the drink conduit 79 will actuate the drink-valve to pivot about the pivot 72 to an open position, and a flow of fluid from the drink spout opening 311 will cause the drink-valve 74 to pivot about the pivot 72 to a closed position. The drink spout 312 may form a drink reservoir 76 that will hold any backwash until the next time a person drinks from the drink spout 312.

Figure 13:
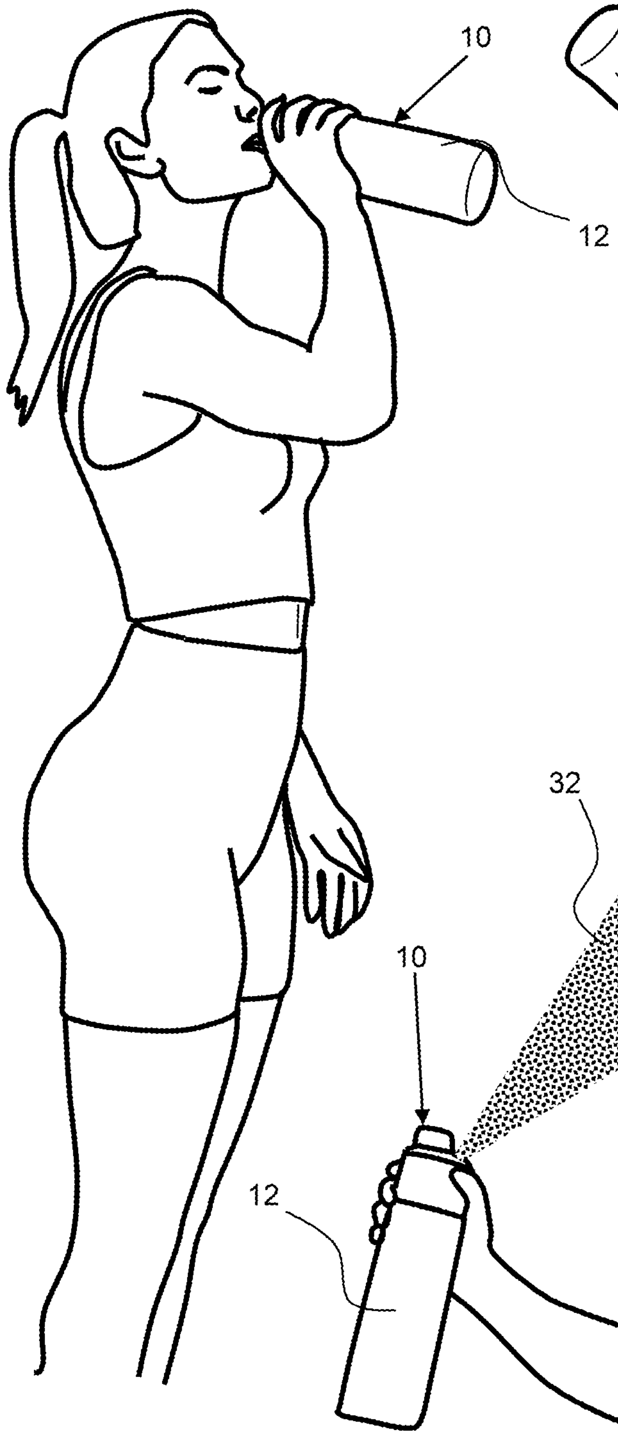
FIG. 13 shows a person drinking from the drinking spout of the drink and mist bottle cap coupled to a bottle.
Figure 14:
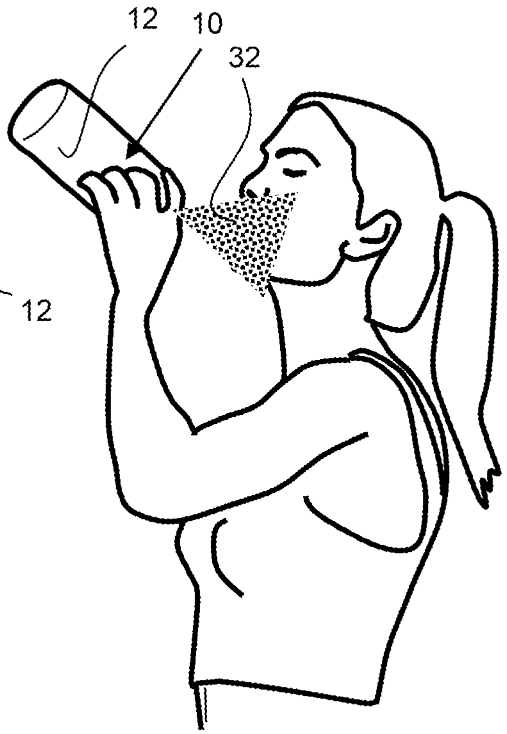
FIG. 14 shows a person producing a mist from the drinking spout of the drink and mist bottle cap coupled to a bottle with the bottle configured upside down, or with the mist bottle cap below the base of the bottle.
Figure 15:
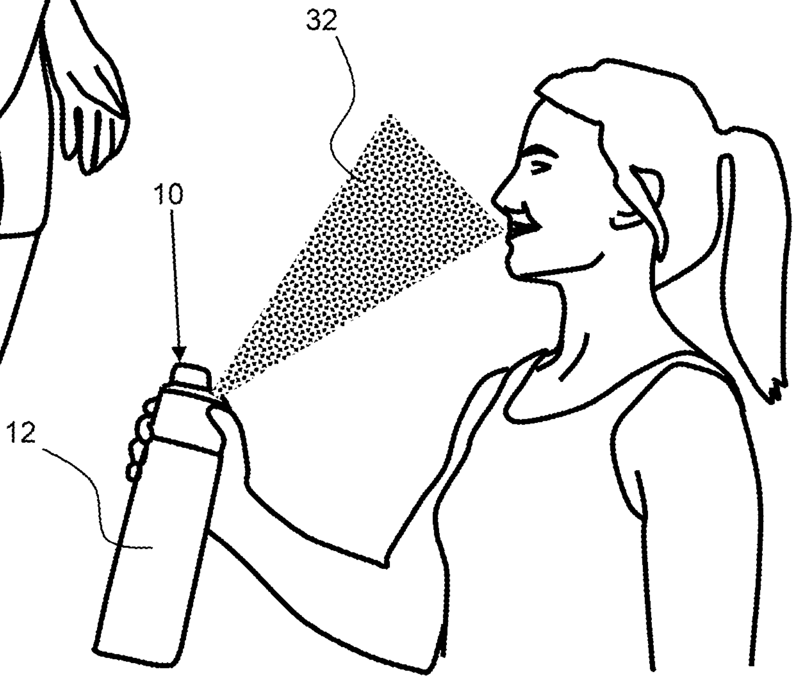
FIG. 15 shows a person producing a mist from the drinking spout of the drink and mist bottle cap coupled to a bottle.

Referring now to FIGS. 13 to 15, an exemplary drink and mist bottle cap 10 is configured for attachment to a bottle 12 to enable a person to both drink from the drink spout as shown in FIG. 13 and produce a mist 32 from the mist nozzle. As shown in FIG. 14, the bottle may be turned upside down and a mist can be produced from the mist nozzle as the intake tube 640, as shown in FIG. 2 is flexible and will allow the intake weighted strainer 660 to fall within the liquid 28 within the bottle 12.

It will be apparent to those skilled in the art that various modifications, combinations, and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A drink and mist bottle cap configured to detachably attach to a bottle, said drink and mist bottle cap comprising:

a) an exterior cap;

b) a drinking spout configured in the exterior cap;

c) a drink spout cap configured to detachably attach to the drink and mist bottle over the drinking spout;

d) an electric pump in the drink and mist bottle cap;

e) an actuator to turn the electric pump on;

f) a battery housing in the drink and mist bottle cap;

g) a battery configured in said battery housing in the drink and mist bottle cap and configured to power the electric pump; and h) a mist nozzle in the drink and mist bottle cap coupled with said electric pump;

wherein said electric pump produces an aerosol of a liquid within said bottle from the mist nozzle that has a droplet size of 100 μm or less; and i) a flexible intake tube coupled with said electric pump and extending to an extended end;

wherein, with the drink and mist bottle cap attached to said bottle, said flexible intake tube is configured to extend into said bottle to draw fluid from within said bottle to said electric pump;

j) an intake weighted strainer configured on the extended end of the flexible intake tube, wherein the flexible intake tube is configured to bend to keep said intake weighted strainer within said liquid inside the bottle;

wherein said drink and mist bottle cap removably attaches to said bottle to allow a user to drink from the drinking spout or produce a mist.

2. The drink and mist bottle cap of claim 1, wherein the mist nozzle is detachably attachable to the drink and mist bottle cap.

3. The drink and mist bottle cap of claim 1, further comprising threads configured to thread onto threads of said bottle to detachably attach the drink and mist bottle cap to said bottle.

4. The drink and mist bottle cap of claim 1, further comprising an anti-backwash valve configured between the drinking spout and said bottle and configured to actuate to a flow position when fluid from within the bottle flows to the drinking spout and actuate to a closed position when fluid flows from the drinking spout back into the bottle.

5. The drink and mist bottle cap of claim 4, further comprising a drink reservoir coupled with the drinking spout and having an opening to said bottle and configured to receive fluid through said opening from said bottle with the drink and mist bottle cap attached to said bottle.

6. The drink and mist bottle cap of claim 5, further comprising a drink conduit that extends from the drink reservoir into the drinking bottle, with the drink and mist bottle cap attached to said bottle, and wherein the anti-backwash valve is configured between the drink reservoir and the drink conduit.

7. The drink and mist bottle cap of claim 6, wherein the anti-backwash valve comprises a pivot and a drink valve configured to pivot about said pivot from said flow position to said closed position.

8. The drink and mist bottle cap of claim 4, further comprising an ultraviolet light device configured to emit ultraviolet light into said bottle with the drink and mist bottle cap attached to said bottle.

9. The drink and mist bottle cap of claim 8, further comprising an interior chamber and wherein the ultraviolet light is configured on an extended end of said interior chamber.

10. The drink and mist bottle cap of claim 8, further comprising a pressure relief valve configured to allow air to flow into said bottle when a vacuum is produced within the bottle by the electric pump producing a mist with the drink and mist bottle cap attached to a bottle.

11. The drink and mist bottle cap of claim 10, wherein the pressure relief valve is configured in the drink spout cap.

12. The drink and mist bottle cap of claim 11, wherein the pressure relief valve comprises an elastic burp valve.

13. The drink and mist bottle cap of claim 4, further comprising a pressure relief valve configured to allow air to flow into said bottle when a vacuum is produced within the bottle by the electric pump producing a mist with the drink and mist bottle cap attached to a bottle.

14. The drink and mist bottle cap of claim 13, wherein the pressure relief valve is configured in the drink spout cap.

15. The drink and mist bottle cap of claim 1, further comprising an ultraviolet light device configured to emit ultraviolet light into said bottle with the drink and mist bottle cap attached to said bottle.

16. The drink and mist bottle cap of claim 15, further comprising an interior chamber and wherein the ultraviolet light is configured on an extended end of said interior chamber.

17. The drink and mist bottle cap of claim 16, further comprising a pressure relief valve configured to allow air to flow into said bottle when a vacuum is produced within the bottle by the electric pump producing a mist with the drink and mist bottle cap attached to a bottle.

18. The drink and mist bottle cap of claim 17, wherein the pressure relief valve is configured in the drink spout cap.

19. The drink and mist bottle cap of claim 18, wherein the pressure relief valve comprises an elastic valve.

* * * * *